March 31, 1931. F. BARTLING 1,798,995
APPARATUS FOR THE DISTILLATION OF SUSPENDED FUEL PARTICLES
Filed April 5, 1928 3 Sheets-Sheet 1

March 31, 1931. F. BARTLING 1,798,995
APPARATUS FOR THE DISTILLATION OF SUSPENDED FUEL PARTICLES
Filed April 5, 1928 3 Sheets-Sheet 3
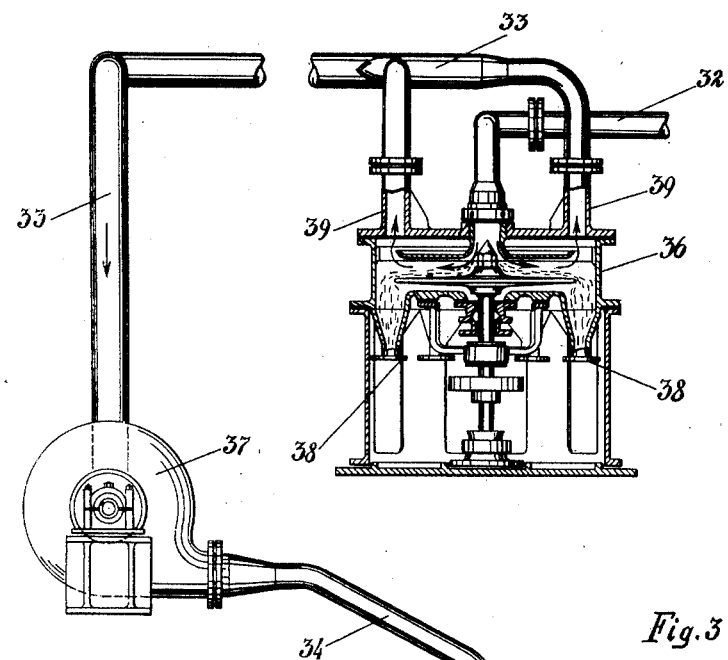
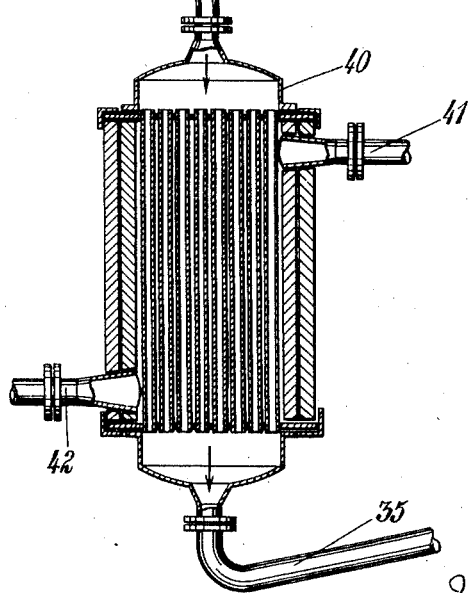
Fig. 3ᵃ

Patented Mar. 31, 1931

1,798,995

UNITED STATES PATENT OFFICE

FRIEDRICH BARTLING, OF MUNICH, GERMANY

APPARATUS FOR THE DISTILLATION OF SUSPENDED FUEL PARTICLES

Application filed April 5, 1928, Serial No. 267,608, and in Germany February 8, 1927.

For the distillation of particles of solid substances maintained suspended in a gas-current, apparatus have become known, in which the gas-flow with the suspended solid particles flows through a vessel comprising at the one end a distributor for the ground bituminous material and at the other end a separator for separating the coke-dust from the gases of distillation.

The vessel is heated either from the outer side or by hot gases as carrying medium for the bituminous material.

In apparatus of known type the most commonly and generally used manner of conducting the suspended dust-particles through the distillation-chamber consists in injecting the bituminous material in the state of dust at the upper end in sprays into the distillation-space of a closed, generally tubular, vertical vessel. The coke-dust is collected at the lower end of the distillation space and discharged in a state as compact as possible. Apparatus have further become known in which the tubular distillation chamber is horizontal, the injector being arranged at the one end and the dust-separator at the other end.

In opposition hereto the characteristic feature according to the invention is, that the bituminous material is blow into the vertical distillation-vessel from below, i. e. in opposition to the action of the gravity. This manner of injecting the bituminous material presents quite considerable advantages as at the distillation of dust of bituminous material the effect of the heat is direct and, on the other hand, the consumption of heat is very high, owing to the great velocity of the material, it is specially important to ensure a uniform action of the heat, as, on the one hand, all the innumerable fuel-particles must come into intimate contact with the heating gases as completely as possible and all at the same time and, on the other hand, excessive heating of individual particles of bituminous fuel must be absolutely avoided for reason that, as is generally known from the principles of the low temperature coking, just the most valuable oils are injured by excessive heating, even when this overheating is very slight.

It is evidently important to ensure that the action of the heat is as uniform as possible for all the particles of bituminous material. This can be obtained only by the finest relative regulating of the heat-effect and of the travelling velocity of the particles. Under these conditions the action of the gravity, little in itself, on the mixture of bituminous particles and distillation-gases plays an important part, and we have ascertained that the injecting of the mixture of gas and fuel from below is a very efficacious means for obtaining, by relative regulating of the forces which drive the gas-mixture to the discharge-port and of the action of the gravity, the finest and most accurate regulation of the flow of bituminous material, this being never possible when the material is charged from above and even less when the material is conveyed through a horizontal distillation-vessel.

Other advantages are obtained in so far as a considerable portion of the coke or semi-coke is already separated automatically from the gases of distillation in the distillation-vessel and can be obtained separately. The arrangements of the discharge port for the product from distillation at the upper end of the distillation vessel in combination with the arrangement of the charging device at the lower end of said vessel presents further substantial advantages for the utilization of separators, into which the mixture of gases and suspended particles of solid material is forced through a narrow gap. When a separator of this type would be arranged at the lower end of the distillation chamber, the solid products from distillation would necessarily drop in great masses, under the action of the gravity, into the separator and clog the same, while, in the arrangement according to the invention, these masses of solid distillation-products separate automatically and cannot get into the separator but are collected separately.

The distributor for the bituminous material may be constructed in various manners, provided that the particles of bituminous fuel are conveyed from below to above and distributed over the entire cross-section of the space in the vessel in such a manner that they are accessible to the action of the heat on their entire surface.

Two forms of construction of the distributor are preferably used, the one with a mechanical centrifugal device and the other with an atomizing nozzle. In the first case, in a preferred form of construction, the distributor may comprise a worm tube the worm of which conveys the bituminous material to a head having a gap and projecting into the vessel, from which gap the bituminous material is sucked by a sprayer and distributed.

The sprayer is preferably arranged as centrifuge in such a manner that a set of concentric funnel-shaped rings, opening towards the interior of the vessel, may be caused to circulate over the outlet-slot for the bituminous material.

When a nozzle is to be used for the distributing of the bituminous material, the advantages are obtained that heated gas may be used for injecting, whereby additional heat-values are injected into the distillation-space.

In a preferred form of construction of this type the distributor consists of a box charged with predetermined quantities of bituminous material and comprising a funnel-shaped mouth-piece above a narrowing, said mouth-piece being open towards the distillation-vessel. Into the narrowing a nozzle for injecting heated gas projects adjustably, so that the width of the annular gap formed between the narrowing and the nozzle may be altered from zero to the maximum value.

The flow of bituminous material blown into the distillation-vessel may further be subdivided by a set of concentric rings built into the opening of the mouth-piece and preferably tapering towards the interior of the funnel so that they subdivide the opening of the mouth-piece into uniform concentric annular gaps.

The problem which we have solved consists, as already mentioned, in the improvement of the mutual regulating of the velocity of flow of the mixture to be submitted to distillation and of the action of the temperature. When this object has to be attained completely, the commonly used arrangements for heating the distillating-vessel are not sufficient. We therefore propose to fit the heating jacket of the vessel with means for heating by flameless combustion whereby a uniformity and facility of regulation of the heating is obtained which cannot be improved. The heating by contact-combustion makes it further possible to decrease or to increase the heating effect zonewise from below upward.

Several embodiments of the invention are illustrated, by way of example, in the accompanying drawings, in which is diagrammatically shown in Fig. 1 one form of construction in section along the vertical central axis.

Figs. 3 and 3a show in section and partly in elevation an apparatus of the second form of construction, Fig. 3a being an extension to the left of Fig. 3.

Figure 1:
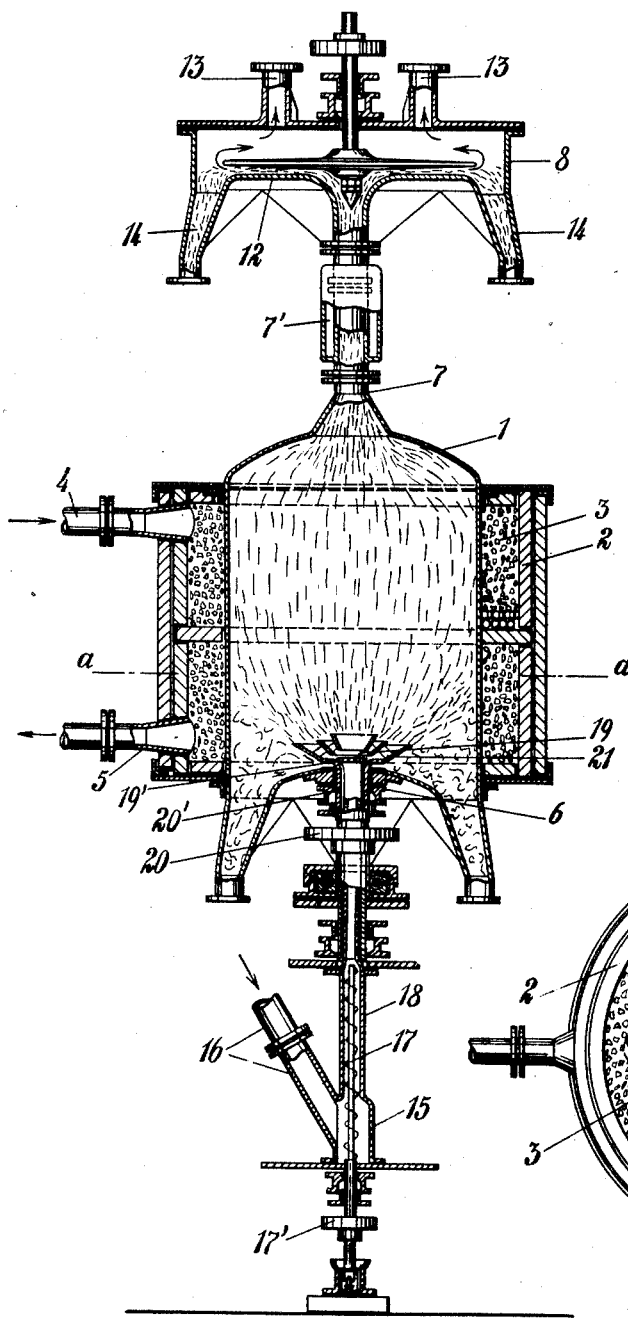

The general arrangement of the distillation-apparatus and of the coke-separator is similar in the two forms of construction.

A vessel 1 of cylindrical, conical, spherical or other convenient shape is made of a material which is a good conductor of heat, for instance copper, iron or other metals. The main wall of the vessel 1 is enclosed by a heating jacket 2 filled with radiating bodies 3 of chamotte which are in contact with the heat exchanging wall of the vessel. Into this jacket combustible gas is supplied for flameless combustion through a pipe 4, in a manner known per se. The gases of combustion, after having travelled around the vessel, are discharged through a pipe 5. It is evident that the heating jacket must be well insulated towards the outer side.

A distributor 6 is arranged in the lower end of the vessel 1, a tubular discharge-pipe 7 being arranged in the top end of the vessel. The distributor 6 sprays over the entire cross-section of the vessel so that the inner space of the vessel is permanently filled with particles of bituminous fuel held in suspension, so that these particles do not touch one another and their entire outer surface is exposed to the action of the heat. The heat acts instantaneously and a flow of distillation-gases is produced in which the fine coke- or semi-coke-particles are floating. The distillation-gas produced flows through the discharge-pipe 7 so that a continual flowing of the newly formed distillation gas is ensured.

The distillation-gas traverses a cooling chamber 7' and flows into the coke-separator 8 in which the coke-particles are separated from the gas.

The coke-separator is of any suitable construction; the separated solid substances are discharged through the tubes 14 and the purified gas is discharged through the tubes 13. The illustrative form shown includes a centrifugal rotating plate having its axis in the line of the discharge pipe 7, so that the gas and coke particles are caused to pass outward relatively radially with respect to the rotating plate, so that the coke particles are thrown centrifugally out of the gas passage, and fall downward into the tubes 14, while the gas passes upward and relatively inward along the upper surface of this rotating plate.

Figure 2:
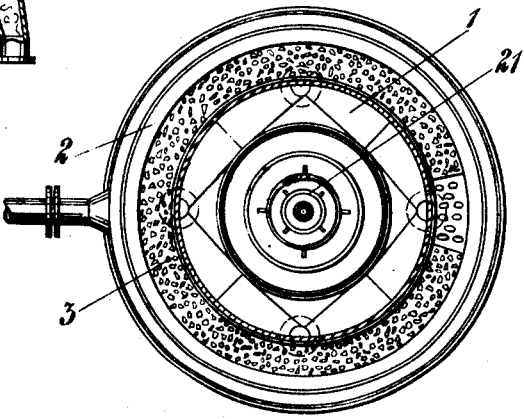
Fig. 2 is a section on line a—a of Fig. 1.

The distributor 6 at the lower end of the vessel 1 comprises, in the form of construction shown in Figs. 1 and 2, a reservoir 15 to which the ground bituminous material is continually supplied through a tube 16. A vertical worm 17, driven from a disk 17', conveys the bituminous material upward from the reservoir 15 through a vertical tube 18 into the vessel 1. The top-end of the tube 18, projecting into the vessel 1, is covered by a disc 19 so that a narrow annular gap 19' is left between the widened edge of tube 18 and the disk 19. A centrifugal device driven from a disc 20 circulates over this gap 19'. The centrifugal device consists, as shown in Figs. 1 and 2, of several concentric rings 21 which are funnel-shaped and enlarged towards the distillation-chamber. These rings 21 are united to form one set, which is rotated from the disk 20 through the intermediary of a tube 20' enclosing the tube 18. Owing to the rapidly rotating set of rings the dust of bituminous material is sucked through the gap 19' and projected into the distillation-space.

Figure 3:
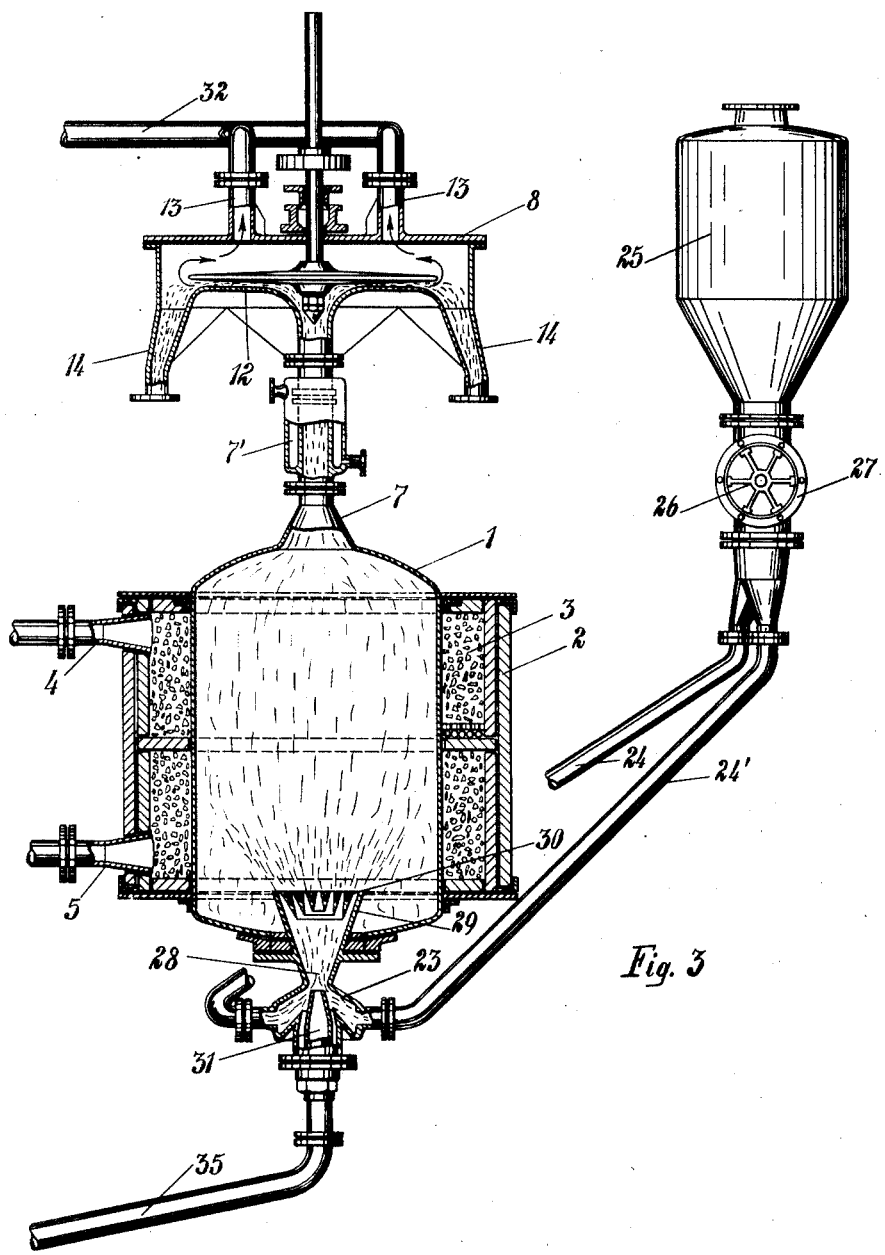

In the form of construction shown in Fig. 3 the distributor consists of a box 23, to which the finely ground bituminous material is supplied through tubes 24, 24' from a reservoir 25 from which it is delivered by a vane-wheel 26 in predetermined quantities into the pipes 24, 24'.

The casing 27 of the vane-wheel 26, which is shown in Fig. 3 as open, is evidently normally closed by a cover. The vane-wheel is rotated by a driving mechanism at such speed that the desired quantities of fuel are delivered.

The box 23 has a peculiar shape, a narrowing 28 being arranged above a circular enlarged portion, the portion of the casing above the narrowing 28 enlarging funnel-shaped to form a mouth-piece 29 which projects into the vessel 1. The opening of the mouth-piece 29 may be subdivided into annular gaps by a set of stationary rings 30. In order to avoid narrowing of the circular gaps at the lower end, the rings are preferably of a cross-section tapering towards the lower end. Through the ring-shaped lower portion of box 23 of the distributor a nozzle 31 projects from below up to the narrowing 28. With the aid of a suitable adjusting mechanism the width of the gap between the nozzle and the narrowing may be varied from zero to the maximum value.

The operation is easy to understand. The gas-jet blown in through the nozzle 31 under pressure sucks the bituminous materials through the annular gap, and distributes the same in the distillation-chamber.

In the installation shown in Figs. 3, 3a pipes 32, 33, 34, 35 connect the discharge tube 7 of the distillating-vessel 1 with the nozzle 31. In these pipings an oil-separator 36, a blower 37 and a preliminary heater 40 are inserted, besides the coke-separator 8 which has already been described. The oil-separator 36 is of a similar construction to the coke separator 8, and purified distillation-gas is supplied to the same through pipe 32 and maintained in the oil-separator at such temperature that the oils condense to be separated from the distillation-gases. The oils obtained are delivered through tubes 39, 38, the gas freed from oil flows through tubes 39, 39 into the pipe 33 which conducts the same to the blower 37. The blower pumps the purified gas through the pipe 34 into a heat exchanging apparatus 40 of commonly used type, through which it flows as heat absorbing medium. The waste gases from the heating jacket flowing through the discharge pipe 5 are conducted through pipe 41, as heat transmitting medium, to the heat exchanger. After they have transmitted their heat, they flow out of the preliminary heater through the pipe 42.

To the nozzle a gas heated at low cost is supplied through the pipe 35 under pressure, said gas being adapted for spraying the fuel.

Claims.

1. Apparatus for the destructive distillation of powdered fuel comprising a treating chamber, a fuel injecting nozzle centrally located at the lower end of said chamber, a distillation gas withdrawal conduit opening into the top of said chamber, means to drive the powdered fuel through said nozzle so that the particles are forced upwardly in said chamber against the action of gravity, said nozzle including means to distribute the powdered fuel in said chamber, and including a plurality of concentric rings providing annular inner channels for the fuel stream entering the chamber from said nozzle, means to rotate said nozzle and rings whereby to cause the same to centrifugally project the powdered fuel into the chamber and thereby assist in the distribution of said fuel in said chamber, and means to heat the walls of said chamber so that the particles are subjected to destructive distillation while suspended in said chamber.

2. Apparatus for the destructive distillation of powdered fuel comprising a treating chamber, a fuel injecting nozzle centrally located at the lower end of said chamber, a distillation gas withdrawal conduit opening into the top of said chamber, conduit means to deliver powdered fuel to said nozzle, said nozzle including a plurality of concentric funnel-shaped rings, means to rotate said nozzle and rings whereby to cause the same to centrifugally project the powdered fuel into the chamber and thereby assist in the distribution of the fuel in said chamber, and means to heat said chamber so that the particles are subjected to destructive distillation while suspended in said chamber.

3. Apparatus as in claim 2, in which the conduit means for delivering fuel to the nozzle includes a vertical powdered fuel supply pipe, a worm in said pipe, and means to rotate said worm to feed the fuel upward in the pipe.

In testimony whereof I have affixed my signature.

FRIEDRICH BARTLING.